United States Patent
Ryu

(10) Patent No.: US 7,616,257 B2
(45) Date of Patent: Nov. 10, 2009

(54) APPARATUS FOR CONTROLLING POWER SOURCE IN MOBILE ELECTRONIC UNIT

(75) Inventor: Hun-young Ryu, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 1317 days.

(21) Appl. No.: 10/738,902

(22) Filed: Dec. 17, 2003

(65) Prior Publication Data
US 2004/0130654 A1    Jul. 8, 2004

(30) Foreign Application Priority Data
Dec. 17, 2002    (KR)    .................. 10-2002-0080832

(51) Int. Cl.
*H04N 5/225* (2006.01)
(52) U.S. Cl. ..................................... 348/372; 363/21.1
(58) Field of Classification Search .................. 348/372; 363/21.1; 455/571–574
See application file for complete search history.

(56) References Cited

U.S. PATENT DOCUMENTS
2002/0186974 A1* 12/2002 Kitani et al. ................. 396/301
2003/0076438 A1*  4/2003 Ishimaru ..................... 348/372

\* cited by examiner

*Primary Examiner*—Sinh Tran
*Assistant Examiner*—Anthony J Daniels
(74) *Attorney, Agent, or Firm*—Drinker Biddle & Reath LLP

(57) ABSTRACT

An apparatus for controlling a power source in a mobile electronic unit using a variety of types of batteries that have different nominal voltages is provided. The apparatus includes a battery unit, a switch unit, which is connected to the battery unit and turns on or off the mobile electronic unit according to user's manipulation, a detection unit, which detects a turn on or off of the switch unit depending on the existence of an input voltage, a first power source unit, which is connected to the battery unit, generates n-channel voltages to then be supplied to elements of the mobile electronic unit, a control unit, which controls the first power source unit and the elements of the mobile electronic unit according to the operation of the detection unit; and a second power source unit to which one channel voltage among the n-channel voltages generated in the first power source unit is applied and which regulates the applied voltage and applies the regulated voltage as an operational voltage of the control unit.

17 Claims, 4 Drawing Sheets

//APPARATUS FOR CONTROLLING POWER SOURCE IN MOBILE ELECTRONIC UNIT

BACKGROUND OF THE INVENTION

This application claims the priority of Korean Patent Application No. 2002-80832, filed on Dec. 17, 2002, in the Korean Intellectual Property Office, the disclosure of which is incorporated herein in its entirety by reference.

1. Field of the Invention

The present invention relates to a mobile electronic unit, and more particularly, to an apparatus for controlling a power source in which power consumption is minimized in a power off mode without additional hardware, in a mobile electronic unit using a variety of types of batteries that have different nominal voltages.

2. Description of the Related Art

The digital camera, which is a type of mobile electronic unit that has a fundamentally different concept than the film-based camera, has been rapidly adopted by increasing numbers of photographers. The digital camera photographs a subject through an optical lens system and stores photographed image information as digital data in a memory card. The digital data stored in the memory card can be processed in a desired shape using a computer and can be easily supplied via a network. Demand for digital cameras is expected to continue increase.

Digital cameras employ a variety of power sources, such as +3.3V, +4.5V, and −9V, according to the operational characteristics of each unit constituting the digital camera. In a digital camera, as shown in FIG. 1, a conventional apparatus for controlling a power source includes a battery unit 11, a switch unit 12, a detection unit 13, a first power source unit 14, a second power source unit 15, a control unit 16, and a camera unit 17.

Referring to FIG. 1, if the switch unit 12 is turned on, the detection unit 13 recognizes that the switch unit 12 is turned on and applies a signal to the control unit 16. The control unit 16 operates by a power source supplied from the second power source unit 15. When the camera does not operate, that is, even when the switch unit 12 is turned off, an output voltage of the battery unit 11 is applied to the control unit 16 through the first power source unit 14 such that the output of the detection unit 13 is continuously monitored. When the camera operates, the control unit 16 detects that the switch unit 12 is turned on, controls the first power source unit 14, and supplies a variety of power sources to the camera unit 17.

In such an apparatus for controlling a power source, when the output voltage of the battery unit 11 is higher than an operational voltage of the control unit 16, the second power source unit 15 is implemented with a voltage drop circuit. When the voltage drop circuit is constituted of a switching regulator, the efficiency of the power source circuit is high, but power consumption of the power source circuit is high. Thus, even when the camera does not operate, power consumption of the battery unit 11 increases. Meanwhile, when the voltage drop circuit is constituted of a series regulator, which is cheaper than a switching regulator, consumption of the battery unit 11 increases because the cost of the power source circuit is low but much heat is generated and the efficiency of the power source circuit is lowered. In addition, when the voltage drop circuit is constituted of both the switching regulator and the series regulator, the structure of the power circuit becomes complex, and costs increase. Meanwhile, when the output voltage of the battery unit 11 is lower than the operational voltage of the control unit 16, the second power source unit 15 is implemented with a voltage boost circuit or a voltage boost and drop circuit. In this case, the voltage boost circuit or the voltage boost and drop circuit can be implemented with the switching regulator. Power consumption of the power source circuit is high, the cost thereof is high, and the efficiency thereof is lowered compared to the efficiency of the voltage drop circuit.

Further, there are a variety of nominal voltages of a battery used in a digital camera such that an operational voltage of the control unit 16 corresponds to a middle range of an output voltage of the battery unit 11. In this case, when the second power source unit 15 is implemented with a series regulator, if the output voltage of the battery unit 11 is lower than a rated output voltage of the second power source unit 15, that is, the operational voltage of the control unit 16, the second power source unit 15 outputs the output voltage of the battery unit 11 without change to the control unit 16. This results in the shutdown of the control unit 16. In order to prevent this phenomenon, if the power source unit is implemented using the switching regulator for the voltage boost or drop circuit and the series regulator, the complexity of hardware increases, costs increase, and voltage conversion is performed twice, thereby causing an efficiency of the power source circuit to be lowered.

SUMMARY OF THE INVENTION

The present invention provides an apparatus for controlling a power source which can be used in a wide range of an input voltage without additional hardware and in which power consumption in a power off mode is minimized and the life span of a battery is elongated, in a mobile electronic unit using a variety of types of batteries that have different nominal voltages.

According to an aspect of the present invention, there is provided an apparatus for controlling a power source in a mobile electronic unit, the apparatus comprising: a battery unit, which supplies a voltage ranging from V1 to V2; a switch unit, which is connected to the battery unit and turns on or off the mobile electronic unit according to user's manipulation; a detection unit, which detects a turn on or off of the switch unit depending on the existence of an input voltage; a first power source unit, which is connected to the battery unit, generates n-channel voltages to then be supplied to elements of the mobile electronic unit; a control unit, which is operated at a voltage V3 within the range from V1 to V2 when the mobile electronic unit is in an on mode, and controls the first power source unit and the elements of the mobile electronic unit according to the operation of the detection unit; and a second power source unit to which one channel voltage among the n-channel voltages generated in the first power source unit is applied and which drops the applied voltage to the voltage V3 and applies the dropped voltage as an operational voltage of the control unit.

According to another aspect of the present invention, there is provided a n apparatus for controlling a power source in a mobile electronic unit, the apparatus comprising: a battery unit, which supplies a voltage ranging from V1 to V2; a switch unit, which is connected to the battery unit and turns on or off the mobile electronic unit according to user's manipulation; a detection unit, which detects a turn on or off of the switch unit depending on the existence of an input voltage; a first power source unit, which is connected to the battery unit, generates n-channel voltages to then be supplied to elements of the mobile electronic unit; a control unit, which is operated at a voltage V3 within the range from V1 to V2 when the mobile electronic unit is in an on mode, and controls the first power source unit and the elements of the mobile electronic unit; a second power source unit, which includes a switch placed at an input terminal to which one channel voltage among the n-channel voltages generated in the first power source unit is applied, adjusts the applied voltage to the voltage V3 to then be supplied to the control unit as an operational voltage; and a logic unit, which controls the switch of the second power source unit according to an operation of the detection unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an apparatus for controlling a power source in a mobile electronic unit according to embodiments of the present invention will be described in detail with reference to the accompanying drawings.

Figure 1:
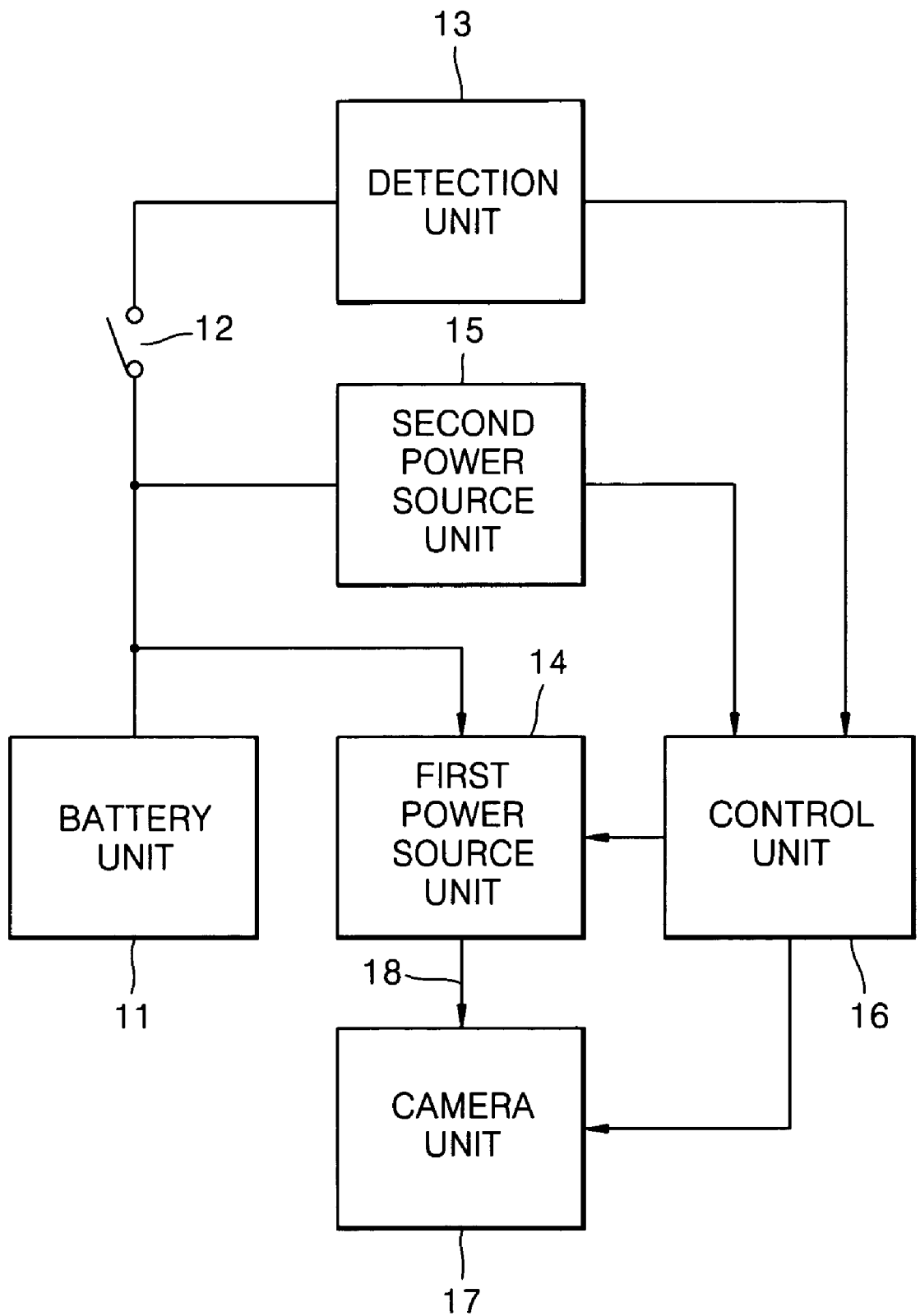
FIG. 1 is a block diagram showing a structure of a conventional apparatus for controlling a power source in a digital camera.
Figure 2:
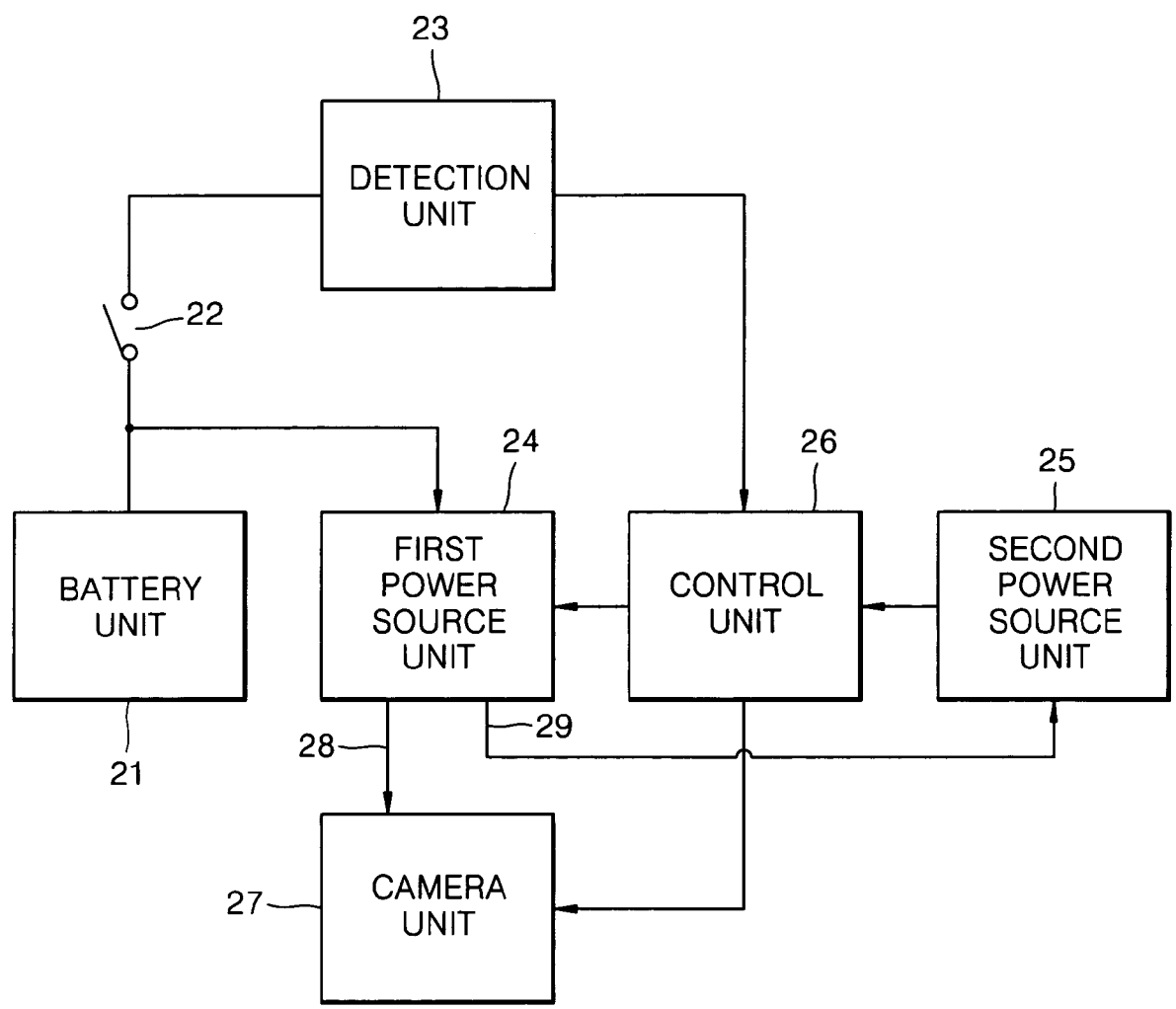
FIG. 2 is a block diagram showing a structure of an apparatus for controlling a power source according to an embodiment of the present invention.

FIG. 2 is a block diagram showing a structure of an apparatus for controlling a power source according to a first embodiment of the present invention. Referring to FIG. 2, the apparatus for controlling a power source includes a battery unit 21, a switch unit 22, a detection unit 23, a first power source unit 24, a second power source unit 25, a control unit 26, and a camera unit 27.

The battery unit 21 uses a single cell lithium ion, multi-call alkaline or nickel metal hydrogen battery. A nominal voltage of each battery is 3V, 2.4V, and 3.7V. In addition, the battery unit 21 may be implemented with a 5V adaptor (not shown). In this case, the nominal voltage supplied from the battery unit 21 ranges from 2.4V to 5V inclusive.

The switch unit 22 is operated by a user to turn on/off a power source of a digital camera. In general, the switch unit 22 is constituted of a toggle switch. If the switch unit 22 is turned on, an output voltage of the battery unit 21 is applied from the switch unit 22 to the detection unit 23. The detection unit 23 detects an on or off state of the switch unit 22 depending on the existence of an input voltage and applies a signal generated according to a detection result to the control unit 26.

The output voltage of the battery unit 21 is always applied to the first power source unit 24 regardless of a turn on/off state of the switch unit 22, and the first power source unit 24 operates by pulse width modulation (PWM) method according to an enable signal supplied from the control unit 26, generates n-channel voltages according to different duty ratios, when the mobile electronic unit is in an on mode, supplies then n-channel voltages 28 to the camera unit 27, and supplies one channel voltage 29 among the n-channel voltages 28 to the second power source unit 25.

The second power source unit 25 is constituted of a series regulator, drops a voltage supplied from the first power source unit 24 to a voltage needed in operating the control unit 26, and supplies the dropped, i.e. reduced, voltage to the control unit 26. The control unit 26 is constituted of a microcomputer that operates at a predetermined DC voltage, for example, 3.3V, supplied from the second power source unit 25. The control unit 26 generates an enable signal according to an output signal of the detection unit 23 and controls the first power source unit 24 and the camera unit 27. Here, in a standby mode, the control unit 26 is designed to be booted at a minimum voltage supplied from the battery unit 21, for example, even at a low voltage of 1.8V.

Figure 3:
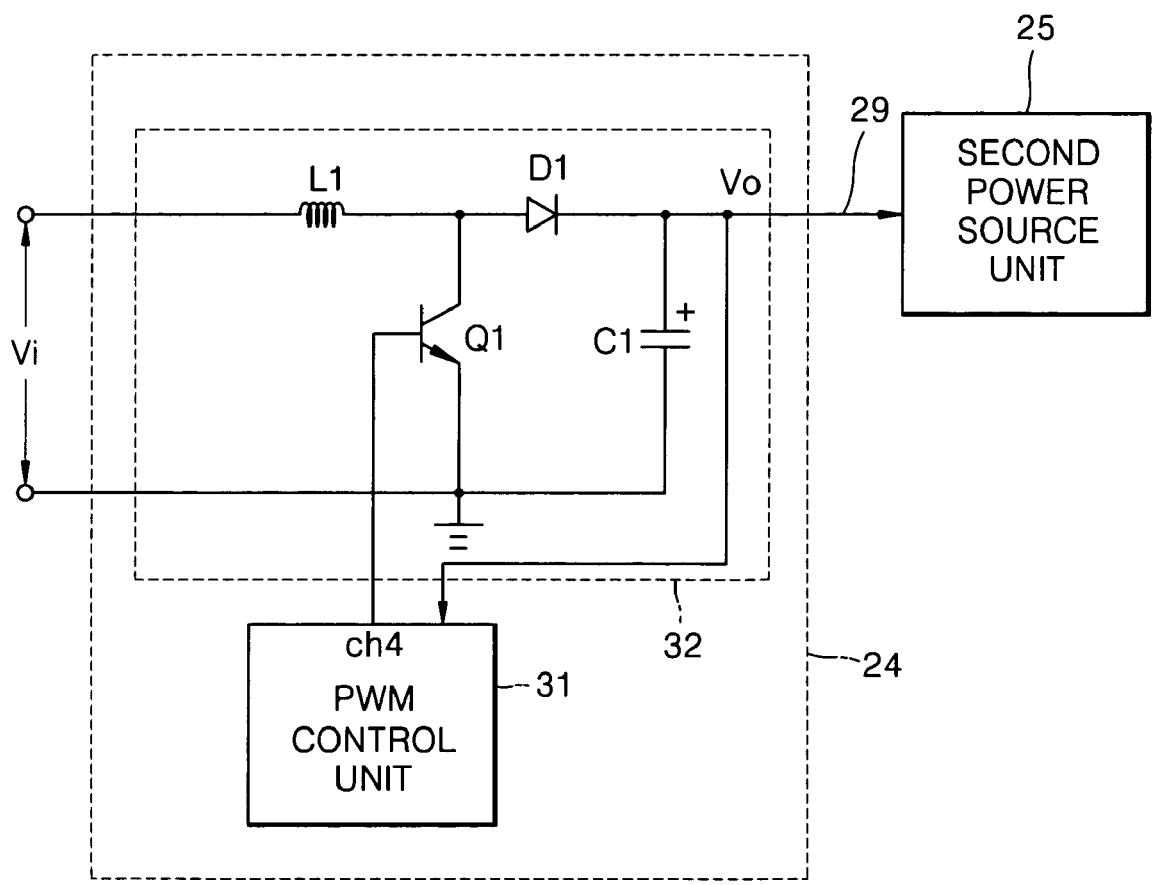
FIG. 3 shows a detailed structure of a first power source unit of FIG. 2.

Then, the first power source unit 24 of FIG. 2 will be described in more detail with reference to FIG. 3.

If power sources having different voltages are needed in a digital camera, the first power source unit 24 uses multiple channels, that is, n (where n is an integer equal to or greater than 2) channels with a pulse width modulation (PWM) method from which difference voltages are generated according to a duty ratio. Each of the n channels is implemented with one of a boost converter, a buck converter, or a buck-boost converter according to output voltage of the battery unit 21 versus operational voltages of elements (not shown) of the camera unit 27. The n-channel voltages 28 respectively generated from the n channels are applied to the elements of the camera unit 27. For explanatory convenience, FIG. 3 shows only the boost converter connected to one channel, for example, channel 4 ch4 of the first power source unit 24 that is connected to the second power source unit 25. However, the boost converter, the buck converter or the buck-boost converter may be connected to each channel formed from a PWM control unit 31.

Meanwhile, one channel among the n channels, for example, a channel (here, ch4) for supplying an operational voltage, that is, 4.5V of a motor (not shown) is implemented with a boost converter 32 comprising an inductor L1, a switching transistor Q1, a diode D1, and a capacitor C1. When the boost converter 32 does not operate, that is, when the switch unit 21 is turned off and the switching transistor Q1 does not operate, the boost converter 32 supplies an input voltage Vi, that is, an output voltage of the battery unit 21 as an output voltage Vo without change. Meanwhile, when the boost converter 32 operates, that is, when the switch unit 21 is turned on and the switching transistor Q1 operates, the boost converter 32 multiplies the input voltage Vi by a predetermined multiplication coefficient and supplies the multiplied input voltage Vi as the output voltage Vo. In other words, when a square wave composted of a high state of a period D1 and a low state of a period D2 is generated in the PWM control unit 31, the multiplication coefficient becomes (D1+D2)/D2, and the output voltage Vo greater than the input voltage Vi, for example, 4.5V is generated.

To sum up, in the first embodiment of the present invention, one channel of the first power source unit 24 is implemented with the boost converter 32. Thus, when a digital camera does not operate, i.e. the camera is in a power-off mode, the output voltage of the battery unit 21 is applied to the second power source unit 25 without any adjustment made by the boost converter 32. If the output voltage of the battery unit 21 is equal to or greater than a rated output voltage, that is, a constant voltage, the second power source unit 25 regulates the output voltage of the battery unit 21 to the rated output voltage and supplies the regulated voltage to the control unit 26. If the output voltage of the battery unit 21 is smaller than the rated output voltage, the second power source unit 25 supplies the output voltage of the battery unit 21 to the is control unit 26 without any regulation. As described above, the control unit 26 is designed to be booted even at a minimum voltage, for example, 1.8V, supplied from the battery unit 21.

Thus, the control unit 26 may operate even when the input voltage that is not adjusted by the second power supply unit 25 is applied to the control unit 26. Meanwhile, when the digital camera operates, the output voltage of the battery unit 21 is boosted to a predetermined multiplication coefficient by the boost converter 32 and is applied to the second power source unit 25. Then, the second power source unit 25 drops the boosted and applied input voltage, for example, 4.5V to the rated output voltage, for example, 3.3V and supplies the dropped voltage to the control unit 26 stably.

Figure 4:
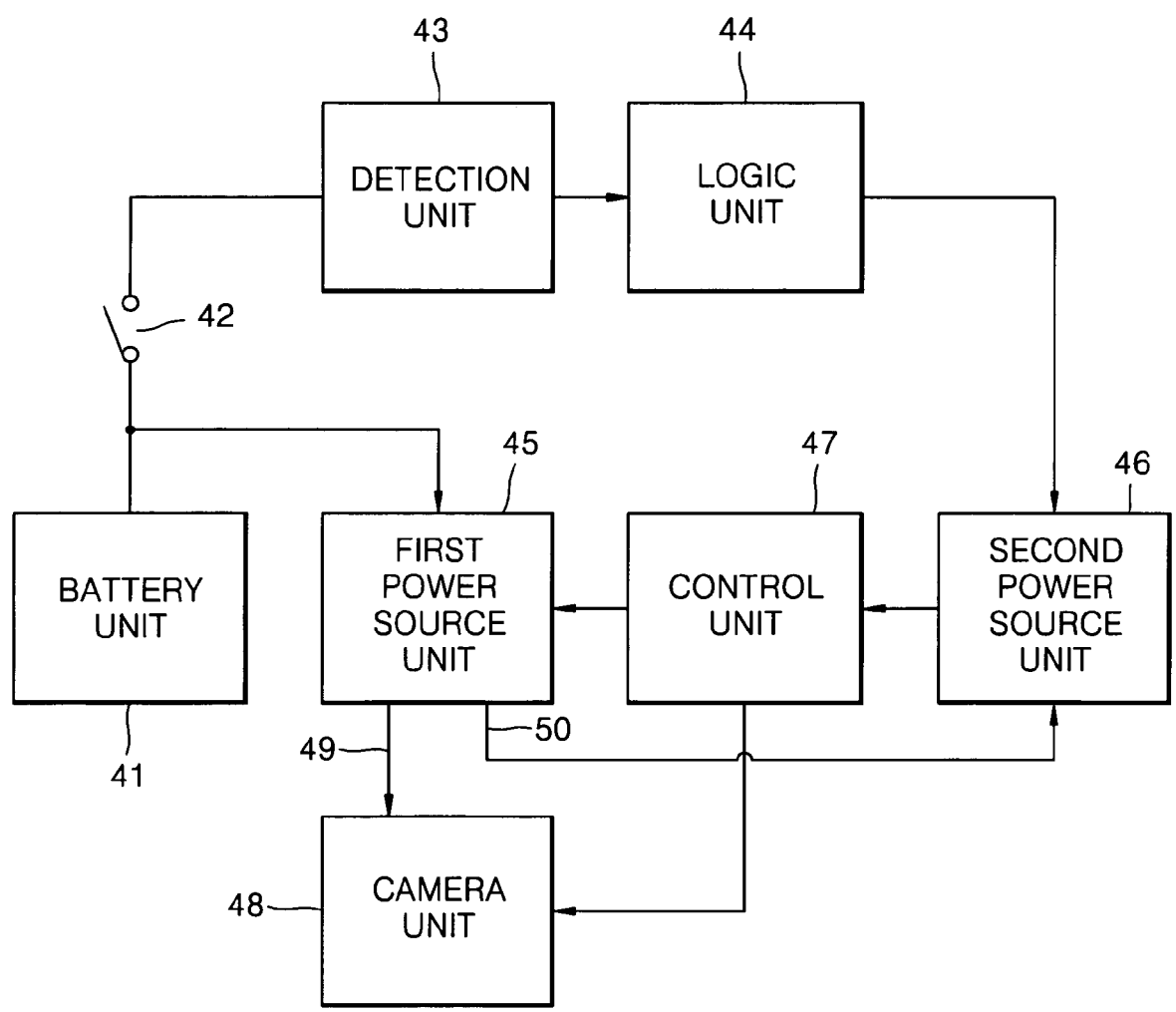
FIG. 4 is a block diagram showing a structure of an apparatus for controlling a power source according to another embodiment of the present invention.

FIG. 4 is a block diagram showing a structure of an apparatus for controlling a power source according to a second embodiment of the present invention. Referring to FIG. 4, the apparatus for controlling a power source includes a battery unit 41, a switch unit 42, a detection unit 43, a logic unit 44, a first power source unit 45, a second power source unit 46, a control unit 47, and a camera unit 48. Here, there is a difference between the first embodiment shown in FIG. 2 and the second embodiment shown in FIG. 4 in that the output signal of the detection unit 23 is applied to the control unit 26 in the first embodiment and an output voltage of the detection unit 43 is applied to the second power source unit 46 via the logic unit 44 in the second embodiment. Thus, detailed descriptions of elements performing the same operations as those of the first embodiment will be omitted.

Referring to FIG. 4, the logic unit 44 may be constituted of a latch device such as a D flip-flop. Other types of logic units may be used as the logic unit 44 as occasion demands. When the detection unit 43 recognizes a toggling state of the switch unit 42 that is implemented with a toggle switch, that is, when a user turns on a digital camera, the logic unit 44 applies a 'high' level signal to the second power source unit 46 until the detection unit 43 recognizes additional toggling of the switch unit 42. In other words, when the detection unit 43 recognizes additional toggling of the switch unit 42, the logic unit 44 applies a 'low' level signal to the second power source unit 46. Here, the level of a signal output from the logic unit 44 may be varied depending on a structure of a switch included in the second power source unit 46.

The second power source unit 46 is implemented with a switching regulator (DC-DC converter) that can be turned on/off, that is, a switching regulator that includes a switch (not shown) at an input terminal. The switch is turned on or off in response to the output signal of the logic unit 44. In other words, when the digital camera operates and the switch is turned on, the second power source unit 46 generates a rated output voltage, for example, 3.3V, and supplies the rated output voltage to the control unit 47. As such, the control unit 47 generates an enable signal and supplies the generated enable signal to the first power source unit 45. Meanwhile, when the digital camera does not operate, the switch is turned off such that a power source path between the second power source unit 46 and the control unit 47 is cut off.

To sum up, in the second embodiment of the present invention, when the digital camera does not operate, the operation of the second power source unit 46 is cut off by the logic unit 44 such that power consumption is minimized in a power off mode.

In the above-described embodiments, a digital camera has been shown. However, the apparatus for controlling a power source according to the present invention can be used in any mobile electronic unit, such as a personal digital assistant (PDA) or a mobile phone, using a battery that has different nominal voltages, without modifying hardware of the mobile electronic unit.

As described above, according to the present invention, by using a battery that has different nominal voltages, in a mobile electronic unit having a wide range of an input voltage, one channel of a multi-channel PWM control unit for supplying a variety of types of power sources to a camera unit is implemented with a boost converter and is connected to a power source unit for supplying a power source of the control unit, such that the power source unit can be used in a wide range of an input voltage without additional hardware and when a camera does not operate, that is, in a power off mode, power consumption is minimized and the life span of the battery is elongated.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for controlling a power source in a mobile electronic unit, the apparatus comprising:
   a battery unit;
   a switch unit, which is connected to the battery unit and turns on or off the mobile electronic unit;
   a detection unit, which detects an on or off state of the switch unit;
   a first power source unit, which is connected to the battery unit, which utilizes two or more channels, and which generates two or more channel voltages to be supplied to elements of the mobile electronic unit, when the mobile electronic unit is in an on mode, wherein the first power source unit generates the two or more channel voltages according to different duty ratios by a pulse width modulation method;
   a control unit, which controls the first power source unit and the elements of the mobile electronic unit; and
   a second power source unit to which one channel voltage among the two or more channel voltages generated in the first power source unit is applied when the mobile electronic unit is in an on mode, and to which the output voltage of the battery unit is applied when the mobile electronic unit is in an off mode, and which regulates the applied voltage and applies the regulated voltage as an operational voltage for the control unit when the mobile electronic unit is in an on mode.

2. The apparatus of claim 1, wherein the battery unit comprises an adaptor and supplies one of a variety of different nominal voltages.

3. The apparatus of claim 1, wherein at least one of the two or more channels of the first power source unit is connected to a boost converter.

4. The apparatus of claim 3, wherein when the mobile electronic unit is in an off mode, the output voltage of the battery unit is applied to the second power source unit without adjustment by the boost converter.

5. The apparatus of claim 1, wherein at least one of the two or more channels of the first power source unit is connected to a buck converter.

6. The apparatus of claim 1, wherein at least one of the two or more channels of the first power source unit is connected to a buck-boost converter.

7. The apparatus of claim 1, wherein the switch unit turns on or off the mobile electronic unit via manipulation by a user.

8. The apparatus of claim 1, wherein the detection unit detects whether the switch unit is in an on or off state depending on the presence of an input voltage.

9. The apparatus of claim 1, wherein the control unit controls elements of the mobile unit based upon signals received from the detecting unit.

10. The apparatus of claim 1, wherein the control unit generates at least one enable signal depending on a signal received from the detecting unit.

11. The apparatus of claim 1, wherein the switch unit comprises a toggle switch.

12. The apparatus of claim 1, wherein the second power source unit comprises a series regulator.

13. The apparatus of claim 1, wherein the control unit comprises a microcomputer.

14. The apparatus of claim 1, wherein the mobile electronic unit is a digital camera.

15. The apparatus of claim 1, wherein the mobile electronic unit is a mobile phone.

16. The apparatus of claim 1, wherein the mobile electronic unit is a personal digital assistant.

17. The apparatus of claim 1, wherein the second power source regulates the applied voltage when the mobile electronic unit is in an off mode when the applied output voltage of the battery unit is approximately equal to or greater than the rated voltage of the control unit, and otherwise does not regulate the applied voltage.

* * * * *

UNITED STATES PATENT AND TRADEMARK OFFICE
CERTIFICATE OF CORRECTION

PATENT NO.      : 7,616,257 B2  
APPLICATION NO. : 10/738902  
DATED           : November 10, 2009  
INVENTOR(S)     : Hun-young Ryu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1727 days.

Signed and Sealed this

Nineteenth Day of October, 2010

David J. Kappos  
*Director of the United States Patent and Trademark Office*